June 17, 1969  A. YTTERHAG  3,449,973
LOCKING DEVICE

Filed June 2, 1967

INVENTOR.
Arne Ytterhag

June 17, 1969        A. YTTERHAG        3,449,973
LOCKING DEVICE

Filed June 2, 1967        Sheet _2_ of 2

INVENTOR.
Arne Ytterhag
BY
Strauch, Nolan, Neale, Nies & Kurz
Attorneys

United States Patent Office 3,449,973
Patented June 17, 1969

3,449,973
LOCKING DEVICE
Arne Ytterhag, Alvsjo, Sweden, assignor to Telefon AB L M Ericsson, Stockholm, Sweden, a corporation of Sweden
Filed June 2, 1967, Ser. No. 643,229
Claims priority, application Sweden, June 7, 1966, 7,747/66
Int. Cl. F16h 31/00
U.S. Cl. 74—128                              5 Claims

ABSTRACT OF THE DISCLOSURE

A locking device for a reciprocating member comprising two tooth-wheels connected to each other on a common axis of rotation, one of said tooth-wheels having teeth cooperating with a pawl of said reciprocating member and being rotated one tooth pitch for each movement of said member in one direction, the other wheel having a less number of teeth, one of said teeth locking said member against movement in the other direction, when said member has reciprocated a predetermined number of times.

---

In many machines and apparatus there is a reciprocally movable member for which such a function is wanted, that the movement should be locked in one direction after that the reciprocating movement has been going on for a certain number of times. The reciprocating movement need not necessarily be rectilinear. It can also take place along a curved path, for example a circular path. An example of an apparatus of the kind indicated is a push-button controlled apparatus for certain purposes, in which a certain push-button should be adapted to be pressed down for instance two subsequent times, and, after the second pressing down, should be locked in a down-pressed or partly down-pressed position. The locking device may be adapted to be released by a repeated, complete pressing down of the push-button from its locked, partly down-pressed position, by pressing down another push-button, which also may be provided with a locking device. The release may also be effected by pressing down an auxiliary push-button.

The present invention relates to a locking device for the purpose indicated above, said locking device being very simple and reliable and giving in comparison to known locking devices, among others, the following advantages:

(1) The locking function is compulsorily controlled.

(2) The locking function and the release function, respectively, may be modified in a very simple way by varying the number of teeth of a tooth-wheel comprised in the locking device.

(3) The release of the locking device may be obtained by other functions, for example by other push-buttons, by movable bars, by relays or the like, whereby the release movement can be adapted to take place from all possible directions and whereby only a very low pressure is required for effecting the release function.

The invention is mainly characterized therein that the device comprises two tooth-wheels said tooth-wheels being mounted on a common axis and rigidly connected to each other and one of said wheels having teeth pointing in one direction and the other wheel having teeth pointing in the other direction; the number of teeth of one of said wheels (the feeding wheel) being greater than the number of teeth of the other wheel (the locking wheel), the reciprocating member being provided with a pawl which, when the reciprocating movement takes place in one direction, rotates the feeding wheel and angle corresponding to one tooth pitch; a locking spring being provided to lock the feeding wheel in the position to which it has been rotated by said pawl, a locking shoulder being provided on said reciprocating member which, after that the feeding wheel has been rotated a predetermined number of steps, cooperates with a tooth of the locking wheel and locks the reciprocating member against movement in the other direction.

Figure 1:
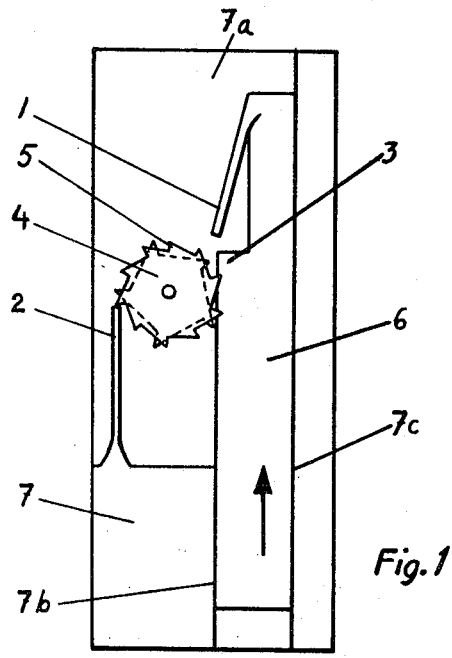
Figure 4:
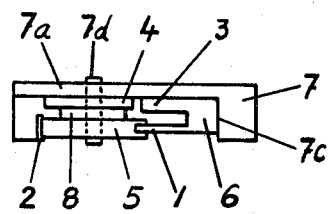
Figure 2:
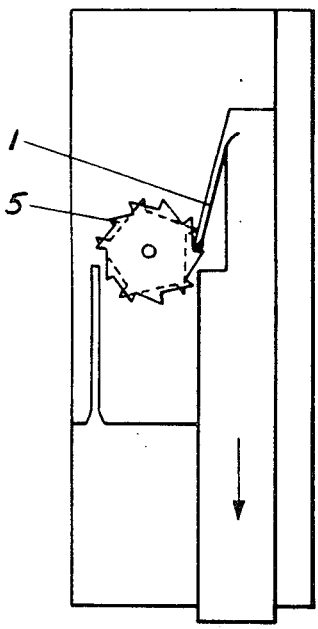
Figure 3:
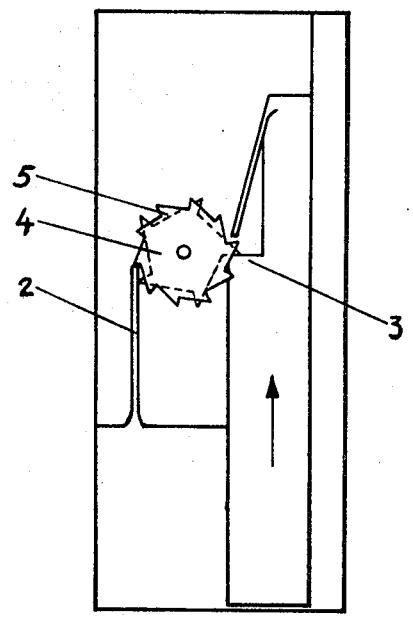

In the following, the invention will be described more in detail, reference being had to the accompanying drawings, in which FIGS. 1–3 illustrate a locking device according to the invention in different working positions and FIG. 4 illustrates the device according to FIG. 1 as viewed from the top.

In the drawing, 6 designates a reciprocating member. The member is guided in a frame or fixed part 7, said part having a base portion 7a and a guiding surface 7b to the left of the reciprocating member 6, according to FIG. 1, and also a guiding surface 7c to the right of the reciprocating member 6. In the base part 7a a pin 7d is fastened, and on this pin two tooth wheels 4 and 5 are pivoted. The tooth wheels 4 and 5 are connected to each other by means of a hollow shaft 8.

The tooth wheel 5 is a feeding wheel and, in the embodiment illustrated, is provided with ten teeth. The teeth are saw-tooth-shaped and the points of the teeth are directed in an anticlockwise direction. The tooth wheel 4 is a locking wheel, and, in the illustrated embodiment, provided with five teeth. Also these teeth are saw-tooth-shaped but the points of said teeth are directed in a clockwise direction. The reciprocating member 6 is provided with a springy pawl 1 which is adapted to cooperate with the teeth of the tooth-wheel 5. Further, the reciprocating member 6 is provided with a shoulder 3 which is adapted, in certain operating positions, to cooperate with the teeth of the tooth-wheel 4.

The frame or fixed part 7 is, as illustrated, provided with a springy portion 2, which constitutes a pawl that cooperates with the teeth of the tooth-wheel 5.

In the operating position illustrated in FIG. 1, the tooth-wheels 4 and 5 are in such angular positions, that the reciprocating member 6 may freely be displaced upwards without any of the teeth of the tooth-wheel 4 being brought to cooperate with the shoulder 3. When the reciprocating member 6 is moving downwards, after that the upwards movement according to FIG. 1 is completed, the pawl 1 cooperates with a tooth on the tooth-wheel 5 as illustrated in FIG. 2, so that both tooth-wheels 4 and 5 are rotated in a clock-wise direction over an angle, which corresponds to one tooth pitch of the tooth-wheel 5. Because the tooth-wheel 4 has only half the number of teeth as the tooth-wheel 5, the tooth-wheel 4 will be turned over a so great angle, that one of its teeth will be brought into the path of movement for the shoulder 3 of the reciprocating member 6. Next time an upwards acting pressure is exerted to the reciprocating member 6, in order to move the reciprocating member upwards, the shoulder 3 will be stopped by the tooth 5 of the tooth-wheel 4, and the upwards movement of the reciprocating member 6 will be prevented. The tooth-wheel 4 can not be turned in an anti clock-wise direction, because the spring 2 is now stopped by one of the teeth of the tooth-wheel 5.

If the reciprocating member 6 should be moved upwards from the position illustrated in FIG. 3, the lock-device has to be released. This may be effected by moving the reciprocating member 6 downwards from the position shown in FIG. 3 to the position shown in FIG. 2. During this movement the pawl 1 again will cooperate with the feeding wheel 5, so that the latter is rotated one tooth pitch. Thereby the locking wheel 4 will be rotated to an angular position in which its teeth are outside the moving path of the shoulder 3 of the reciprocating member 6, so that the reciprocating member now is free to be moved upwards to the position shown in FIG. 1.

Release of the locking device may also take place by bending the spring 2 to the left. This may be accomplished by means of an auxiliary push-button or by the movement of a release bar (not shown), which may be common for more push-buttons arranged in a row, adjacent to each other, and which may be adapted to be actuated by each of said push-buttons. Release of the locking device may also take place by means of a relay (not shown) or by some other suitable means.

As will be apparent from the figure, the feeding wheel 5 has a number of teeth which is greater than the number of teeth of the locking wheel 4. In the embodiment illustrated the feeding wheel has twice as many teeth as the locking wheel. In this arrangement the upwards movement of the reciprocating member 6 will be locked once every two times the reciprocating member is actuated by an upwards directed force. It may be assumed, that the reciprocating member is the stem of a push-button which has been pressed down and which has been released and is actuated by a restoring force.

In certain cases it may be desirable to lock the reciprocating member every third time an upwards directed force is exerted to the member. This kind of operation may be achieved by making the feeding wheel 5 with three times as many teeth as the locking wheel 4.

It is also possible to obtain such a function that between two locking conditions for the reciprocating member 6, a release of the locking device will be obtained after a certain number, for example one, additional down-push, while, between two other locking conditions, the release of the locking device may take place after another number, for example two or three additional pushings-down. This may be achieved by making the locking wheel 4 with an uneven tooth pitch, so that the feeding wheel 5 on certain occasions has to be rotated an angle, corresponding to, for example, the double tooth pitch in order to turn the locking wheel 4 from one locking position to another, and on other occasions to be rotated an angle, corresponding to, for example three or four times the tooth pitch.

It is of course possible to obtain any wanted "pattern" for the operation of the reciprocating member 6 in this respect.

In order to modify the properties of the device in said respects, it is suitable to arrange the device in that way, that the unit consisting of the wheels 4 and 5 and the hollow shaft 8 is easily exchangeable. It is also possible to provide for more feeding wheels 5 and more locking wheels 4 located adjacent to each other on the same shaft, so that by an axial displacement of the unit, which thus consists of more pairs of wheels, different pairs of wheels may be brought to cooperate with the springs 1 and 2 and the shoulder 3. It is also possible to bring about a release of the locking device by axial displacement of the wheels 4 and 5 instead of bending the spring 2 to the left as indicated above.

Different modifications of the invention may be made within the scope of the appended claims.

What I claim is:

1. A locking device for a reciprocating member comprising two tooth-wheels mounted on a common axis of rotation, said wheels being rigidly connected to each other and provided with teeth pointing in opposite directions, the number of teeth of one wheel (the feeding wheel) being greater than the number of teeth of the other wheel (the locking wheel), the reciprocating member being provided with a pawl said pawl rotating the feeding wheel an angle corresponding to one tooth pitch when the reciprocating member is moving in one direction (according to the arrow in FIG. 2), a locking spring being provided, said locking spring being adapted to lock the feeding wheel in the position to which it has been rotated, a shoulder being provided on said reciprocating member, said shoulder cooperating with a tooth on the locking wheel after that the feeding wheel has been rotated a determined number of steps, said shoulder locking the movement of the reciprocating member against full return in the other opposite direction (the direction of the arrow in FIG. 3).

2. A locking device according to claim 1, wherein the locking wheel as well as the feeding wheel are exchangeable either separately or together as a unit.

3. A locking device according to claim 1 wherein the locking spring which locks the feeding wheel is adapted to be moved out of locking position in order to release the locking condition of the locking device.

5. Locking device for a reciprocating shifting element with two toothed control wheels attached on a common axis, and a pawl, characterized in that the two wheels (4, 5) are firmly connected with one another, whereby the number of teeth of the shifting wheel (5) is greater than that of the locking wheel (4), and in that the reciprocating shifting element (6) has a fixed shifting pawl (1) and a stop (3) whereby the shifting pawl co-operates with the shifting wheel and the stop with the locking wheel, and has been arranged in such a way that it limits specifically the return stroke of the reciprocating element.

5. Locking device according to claim 4, characterized in that an additional device has been provided, which guides the pawl (2) from out of the locking position.

References Cited

UNITED STATES PATENTS

| | | | |
|---|---|---|---|
| 1,565,336 | 12/1925 | Seufert | 74—128 |
| 2,866,024 | 12/1958 | Ginn | 200—156 |
| 47,315 | 4/1865 | McGill | 74—148 |
| 3,331,038 | 7/1967 | Foster et al. | 335—140 |

FRED C. MATTERN, Jr., *Primary Examiner.*

W. S. RATLIFF, Jr., *Assistant Examiner.*

UNITED STATES PATENT OFFICE
CERTIFICATE OF CORRECTION

Patent No. 3,449,973    Dated June 17, 1969

Inventor(s) Arne Ytterhag

It is certified that error appears in the above-identified patent and that said Letters Patent are hereby corrected as shown below:

Column 3, line 14, "figure" should read -- figures --.
Column 4, line 33, "5" should read -- 4 --.

Signed and sealed this 29th day of June 1971.

(SEAL)
Attest:

EDWARD M. FLETCHER, JR.         WILLIAM E. SCHUYLER, JR.
Attesting Officer               Commissioner of Patents